8712X
N. Baker,
Plow.
Patented Mar 24. 1835
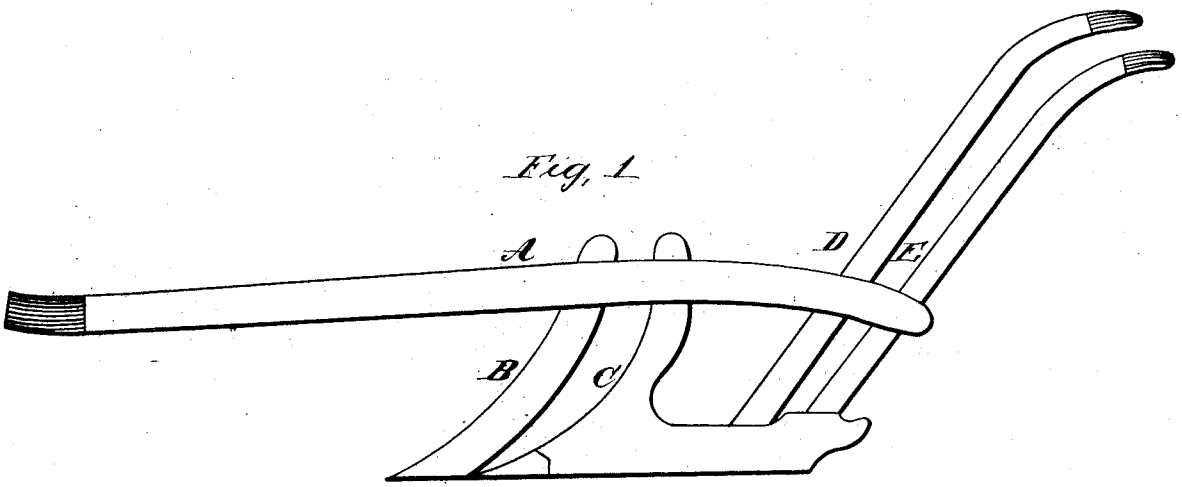
Fig. 1
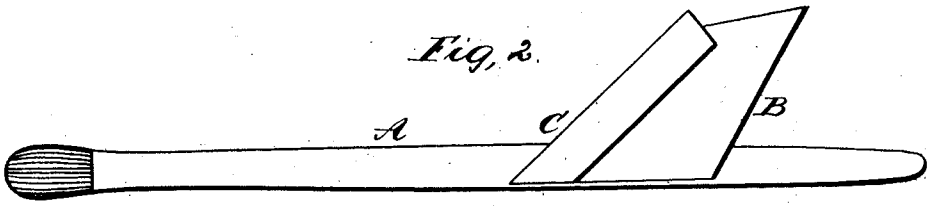
Fig. 2
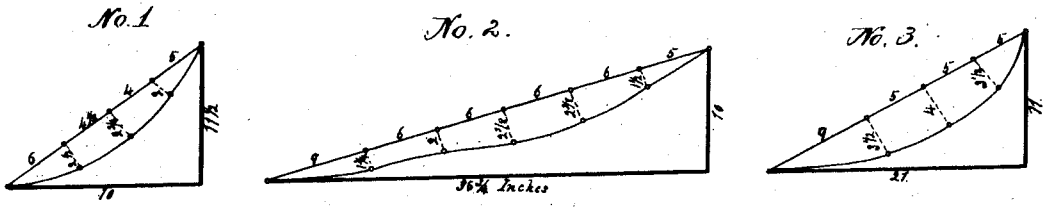

UNITED STATES PATENT OFFICE.

8712X

NATHAN BAKER, OF PENN TOWNSHIP, CASS COUNTY, MICHIGAN TERRITORY.

IMPROVEMENT IN PLOWS.

Specification forming part of Letters Patent dated March 24, 1835.

*To all whom it may concern:*

Be it known that I, NATHAN BAKER, of Penn township, in the county of Cass and Territory of Michigan, have invented a new and useful Improvement in Plows; and I do here by declare that the following is a full and exact description of the construction and operation of the said improved steel-pointed plow as invented or improved by me.

In the triangle No. 1 is a representation of the curvature of the fore part of the mold-board, and it varies from a straight line nineteen and one-half inches in length, extended from the point of the plowshare to the height of eleven and one-half inches perpendicular. The first distance, taken at right angles from said line six inches from the point of said share, was found to be two and one-half inches to said mold-board; second distance, taken as aforesaid, ten and one-half inches from said point is two and three-quarters inches; third distance, taken as aforesaid, fourteen and one-half inches from said point, is two inches.

In triangle No. 2 is a representation of the curvature of the aforesaid mold-board, showing its variation from a straight line thirty-eight inches long, extending from the point of the plowshare to the extreme hind part of the mold-board to the height of ten inches perpendicular. The first distance, taken from said line nine inches from the point of said plowshare, and at right angles, is one and three-quarters inch from said line to the mold-board; second distance, fifteen inches from said line, taken as aforesaid, is two inches; third distance, taken as aforesaid, twenty-one inches from said point, two and three-eighths inches; fourth distance, taken as aforesaid, twenty-seven inches from said point, two and three-eighths inches; fifth distance, taken as aforesaid, thirty-three inches from said point, one and one-half inch.

In the triangle No. 3 is a representation of the mold-board, showing its variation from a straight line twenty-four inches long, extending from the point of said plowshare, and dividing the angle formed by the intersection of the other two lines in two equal parts, to the top of the mold-board to the height of eleven inches. The first distance, taken at right angles from said line to the mold-board, nine inches from the point of said share, is three and one-half inches; second distance, taken as aforesaid, fourteen inches from said point, is four inches; third distance, taken as aforesaid, nineteen inches from said point, is three and one-half inches.

Figure No. 1 is a side view of said plow. A is the beam, six feet long; B, the colter, the point made of steel, and extending six inches beyond the point of the plowshare; C, the mold-board, including the front side, which is four inches wide; D and E, the handles. Fig. is a top view of the said plow. A is the mold-board, made of cast-iron; C, the plowshare or point, made of steel, twenty-one inches in length and four inches in breadth.

The said steel-pointed plow will turn a furrow square over, so as to make a joint with the preceding furrow when propelled by any sufficient power.

NATHAN BAKER.

Witnesses:
ABNER KELSEY,
E. B. SHERMAN.